(12) United States Patent
Kim et al.

(10) Patent No.: US 10,088,931 B2
(45) Date of Patent: Oct. 2, 2018

(54) SILVER NANOWIRES, PRODUCTION METHODS THEREOF, CONDUCTORS AND ELECTRONIC DEVICES INCLUDING THE SAME

(71) Applicant: SAMSUNG ELECTRONICS CO., LTD., Suwon-si, Gyeonggi-do (KR)

(72) Inventors: Mi Jeong Kim, Hwaseong-si (KR); Chan Kwak, Yongin-si (KR); Junghwa Kim, Yongin-si (KR); Dong Su Ko, Seoul (KR); Kwanghee Kim, Seoul (KR); Jiye Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 126 days.

(21) Appl. No.: 15/351,788

(22) Filed: Nov. 15, 2016

(65) Prior Publication Data
US 2017/0139514 A1    May 18, 2017

(30) Foreign Application Priority Data
Nov. 16, 2015    (KR) .......................... 10-2015-0160654

(51) Int. Cl.
*H05K 1/09*    (2006.01)
*H05K 1/00*    (2006.01)
(Continued)

(52) U.S. Cl.
CPC .......... *G06F 3/0412* (2013.01); *B22F 1/0025* (2013.01); *B32B 15/02* (2013.01); *B32B 15/08* (2013.01); *C22F 1/14* (2013.01); *G06F 3/045* (2013.01); *B22F 2301/255* (2013.01); *B22F 2304/05* (2013.01); *B32B 2307/202* (2013.01); *B32B 2457/208* (2013.01); *G06F 2203/04102* (2013.01); *G06F 2203/04103* (2013.01)

(58) Field of Classification Search
CPC . B32B 15/02; B32B 2307/202; B22F 1/0025; B22F 2301/255; B22F 2304/05
USPC .......................... 174/253, 256; 428/457, 673
See application file for complete search history.

(56) References Cited

U.S. PATENT DOCUMENTS 7,569,503 B2    8/2009 Pan et al.
7,585,349 B2    9/2009 Xia et al.
(Continued)

FOREIGN PATENT DOCUMENTS

EP    1947701 A2    7/2008
EP    1947702 A2    7/2008
(Continued)

OTHER PUBLICATIONS

Austin M. Leach, et al., "Deformation of Top-Down and Bottom-Up Silver Nanowires", Adv. Funct. Mater. 2007, 17, 43-53.
(Continued)

*Primary Examiner* — Sherman Ng
(74) *Attorney, Agent, or Firm* — Cantor Colburn LLP

(57) ABSTRACT

An electrical conductor includes a substrate; and a conductive layer disposed on the substrate and including a plurality of silver nanowires, wherein the silver nanowires exhibit a main peak assigned to a (111) crystal plane in an X-ray diffraction spectrum thereof, and a 2θ full width at half maximum (FWHM) of the main peak after Gaussian fitting is less than about 0.40 degrees.

24 Claims, 14 Drawing Sheets

(51) Int. Cl.
*B32B 15/04* (2006.01)
*B32B 15/01* (2006.01)
*G06F 3/041* (2006.01)
*G06F 3/045* (2006.01)
*B32B 15/02* (2006.01)
*B32B 15/08* (2006.01)
*B22F 1/00* (2006.01)
*C22F 1/14* (2006.01)

(56) References Cited

U.S. PATENT DOCUMENTS

| | | | |
|---|---|---|---|
| 8,049,333 B2 | 11/2011 | Alden et al. | |
| 9,050,775 B2 | 6/2015 | Fu et al. | |
| 2007/0065651 A1* | 3/2007 | Glatkowski | B82Y 30/00 428/297.4 |
| 2007/0074316 A1* | 3/2007 | Alden | B82Y 30/00 257/784 |
| 2010/0243295 A1* | 9/2010 | Allemand | B82Y 10/00 174/250 |
| 2011/0024159 A1 | 2/2011 | Allemand et al. | |
| 2014/0234661 A1* | 8/2014 | Allemand | H01B 1/02 428/673 |
| 2014/0262453 A1* | 9/2014 | Poon | H05K 3/12 174/253 |
| 2015/0090573 A1* | 4/2015 | Mansky | H03K 17/9618 200/5 R |
| 2015/0111048 A1* | 4/2015 | Kim | H01B 1/22 428/457 |
| 2015/0156866 A1* | 6/2015 | Shim | H05K 1/0274 361/751 |

FOREIGN PATENT DOCUMENTS

| | | |
|---|---|---|
| EP | 2879134 A1 | 6/2015 |
| EP | 3006481 A1 | 4/2016 |
| KR | 1020110131533 A | 12/2011 |
| KR | 101470752 B1 | 12/2014 |
| WO | 2010129604 A1 | 11/2010 |
| WO | 2014192839 A1 | 12/2014 |

OTHER PUBLICATIONS

Cai-Hong Liu, et al., "Silver nanowire-based transparent, flexible, and conductive thin film", Nanoscale Research Letters 2011, 6:75, pp. 1-8.

Chang-Hyun Song, et al., "Intense-pulsed-light irradiation of Ag nanowire-based transparent electrodes for use in flexible organic light emitting diodes", Organic Electronics (2015) v. 17, pp. 208-215.

Jinhwan Lee, et al., "Room-Temperature Nanosoldering of a Very Long Metal Nanowire Network by Conducting-Polymer-Assisted Joining for a Flexible Touch-Panel Application", Adv. Funct. Mater. 2013, v. 23, pp. 4171-4176.

Jinting Jiu, et al., "Strongly adhesive and flexible transparent silver nanowire conductive films fabricated with a high-intensity pulsed light technique", J. Mater. Chem., 2012, v. 22, pp. 23561-23567.

Qingquan Qin, et al., "Recoverable plasticity in penta-twinned metallic nanowires governed by dislocation nucleation and tretraction", Nature Communications, 2015, pp. 1-8.

Takehiro Tokuno, et al., "Fabrication of Silver Nanowire Transparent Electrodes at Room Temperature", Nano Res. 2011, 4(12): 1215-1222.

Young Soo Yun, et al., "Transparent conducting films based on graphene oxide/silver nanowire hybrids with high flexibility", Synthetic Metals, (2012) v. 162, pp. 1364-1368.

Giusti, G., et al., "Thermal annealing effects on silver nanowire networks", Int. J. Nanotechnol., vol. 11, No. 9/10/11, 2014, pp. 785-795.

Extended European Search Report dated Apr. 20, 2017, of the corresponding European Patent Application No. 16199135.1.

\* cited by examiner

FIG. 3

| Window |
|---|
| Second optically clear adhesive layer |
| Second transparent electrically conductive film |
| First optically clear adhesive layer |
| First transparent electrically conductive film |
| Display panel |

SILVER NANOWIRES, PRODUCTION METHODS THEREOF, CONDUCTORS AND ELECTRONIC DEVICES INCLUDING THE SAME

CROSS-REFERENCE TO RELATED APPLICATIONS

This application claims priority to and the benefit of Korean Patent Application No. 10-2015-0160654 filed in the Korean Intellectual Property Office on Nov. 16, 2015, and all the benefits accruing therefrom under 35 U.S.C. § 119, the entire content of which in its entirety is herein incorporated by reference.

BACKGROUND

1. Field

The present disclosure relates to silver nanowires, methods of manufacturing the silver nanowires, and conductors and electronic devices including the same.

2. Description of the Related Art

Demand for portable display devices including a large-size display is guiding the development of advanced technologies for a flexible display. In the flexible display, there is a need for a flexible electronic material allowing a high resolution, a high sensitivity, and a low power consumption without deterioration of its electrical properties under bending, folding, and twisting. As a constituent element of the display, a touch sensor acts as an interface between the user and the display device and plays a role of searching the user's information and receiving the directions. The touch sensor includes a transparent conductive material as an electrode.

Accordingly, the development of a flexible transparent electrode material capable of maintaining high transmittance and having low sheet resistance is desirable for its application to a flexible display such as a bendable/foldable display.

SUMMARY

An embodiment relates to a flexible electrical conductor having improved conductivity and light transmittance.

Another embodiment relates to an electronic device including the aforementioned electrical conductor.

Yet another embodiment is related to a plurality of silver nanowires included in the electrical conductor.

Still another embodiment relates to a method of producing the plurality of silver nanowires.

In an embodiment, an electrical conductor includes
a substrate; and
a conductive layer disposed on the substrate and including a plurality of silver nanowires,
wherein the silver nanowires exhibit a main peak assigned to a (111) crystal plane in an X-ray diffraction spectrum thereof, and a 2θ full width at half maximum of the main peak after Gaussian fitting is less than about 0.40 degrees.

The substrate may be flexible. The substrate may have a flexural modulus of at least about 10 MPa.

The substrate may include poly(meth)acrylate, polyolefin, polyvinylchloride, fluoropolymer, polyamide, polyimide, polysulfone, polyetheretherketone, polynorbornene, polyester, polycarbonate, polyurethane, polydimethylsiloxane, a copolymer thereof, or a combination thereof.

The plurality of silver nanowires may have an average diameter of less than or equal to about 100 nanometers (nm) (for example, as determined by a scanning electron microscopic analysis).

The plurality of silver nanowires may have an aspect ratio of greater than or equal to about 100.

The full width at half maximum (FWHM) of the main peak may be less than or equal to about 0.38 degrees.

The full width at half maximum (FWHM) of the main peak may be less than or equal to about 0.31 degrees.

The peak may be at diffraction angles two-theta of about 35 degrees to about 42 degrees.

The electrical conductor may have a sheet resistance of less than or equal to about 100 ohms per square (ohm/sq), a haze of less than or equal to about 1.0%, and visible light transmittance of greater than or equal to about 80%.

The electrical conductor may have a resistance change rate of less than or equal to about 152%, for example, less than or equal to about 64% after 200,000 times of bending at a curvature radius of 1 mm as measured under a strain of 6.7% at a temperature of 20 to 25° C. and a humidity of 45 to 55% with a distance between electrodes of 10 centimeters (cm) in an outer bending mode.

The conductor may further include an overcoat layer directly on the conductive layer, the overcoat layer including a thermosetting resin, an ultraviolet (UV) curable resin, or a combination thereof.

In another embodiment, an electronic device including the electrical conductor is provided.

The electronic device may include a display, a touch screen panel, a solar cell, an e-window (e.g., electrochromic window or smart window), an electrochromic mirror, a transparent heater, a heat mirror, a transparent transistor, a transparent displacement sensor (strain sensor), a flexible wire electrode, a flexible solar cell, a flexible battery electrode, a flexible display, or a combination thereof.

Another embodiment provides a population of silver nanowires (e.g., including a plurality of silver nanowires) exhibiting a main peak assigned to a (111) crystal plane in an X-ray diffraction spectrum thereof and having a 2θ full width at half maximum of the main peak after Gaussian fitting of less than about 0.40 degrees.

At least one of the plurality of silver nanowires has a (111) crystal plane as determined by a transmission electron microscopic observation to a cross-section of the nanowire, and the (111) crystal plane may have a pentagonal shape defined by five triangular surfaces and may include a twin boundary.

The population of the silver nanowires may have an average diameter of less than or equal to about 25 nm and an aspect ratio of greater than or equal to about 100.

The population of the silver nanowires may have an average length of greater than or equal to about 2.5 micrometers (μm) (for example, as determined by a scanning electron microscopic analysis).

The main peak may have a 2θ full width at half maximum (FWHM) of less than or equal to about 0.38 degree after Gaussian fitting.

The main peak may be at diffraction angles two-theta of between about 35 degree and about 42 degree.

According to further another embodiment, a method of manufacturing the population of silver nanowires includes:
dispersing a plurality of silver nanowires in a medium; and
annealing the plurality of silver nanowires at a temperature of about 50° C. to about 80° C. for greater than or equal to about 30 minutes, wherein the population of silver nanowires exhibits a main peak assigned to a (111) crystal plane in an X-ray diffraction spectrum thereof, and wherein a 2θ full width at half maximum (FWHM) of the main peak is decreased by the annealing.

The silver nanowires have a (111) crystal plane as measured by determined by a transmission electron microscopic observation to a cross-section of the nanowire, and the (111) crystal plane may have a pentagonal shape defined by five triangular surfaces and may include a twin boundary.

The medium may include water and an organic additive miscible with water, and the plurality of silver nanowires may be dispersed in the medium.

The medium may include a polymer, and at least a portion of the plurality of silver nanowires may be embedded in the medium.

The annealing may be performed for greater than or equal to about 1 hour.

The full width at half maximum (FWHM) of the peak may be between about 0.41 degrees to about 0.50 degrees prior to the annealing.

The full width at half maximum (FWHM) of peak may be less than about 0.40 degrees after the annealing.

The electrical conductor including the plurality of silver nanowires may demonstrate an improved level of electrical and optical properties and when subjected to a bending, the electrical conductor may exhibit a smaller decrease in electrically conductive properties and may have a reduced resistance change rate.

Therefore, the electrical conductor may be used in a transparent electrode structure (e.g., a transparent electrode film) that is used as a touch sensor of a flexible display device such as a bendable or foldable display.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a schematic view of a touch screen panel according to an embodiment;

DETAILED DESCRIPTION

Figure 1:
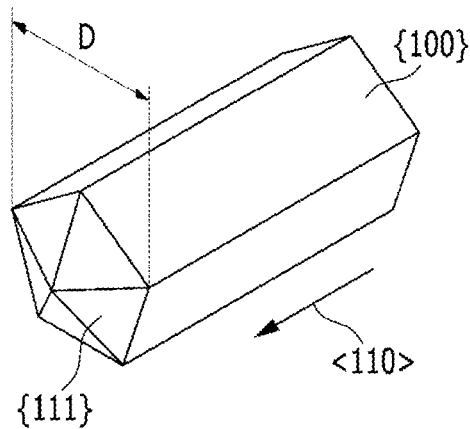
FIG. 1 is a schematic view showing a pentagonal silver (Ag) nanowire.

Advantages and characteristics of this disclosure, and a method for achieving the same, will become evident referring to the following exemplary embodiments together with the drawings attached hereto. However, this disclosure may be embodied in many different forms and is not be construed as limited to the embodiments set forth herein. If not defined otherwise, all terms (including technical and scientific terms) in the specification may be defined as commonly understood by one skilled in the art.

Further, the singular includes the plural unless mentioned otherwise.

In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or."

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Herein, the term "acryl polymer" may refers to a (meth)acrylic acid polymer or a (meth)acrylate polymer. "(Meth)acrylic" includes acrylic and methacrylic, and "(meth)acrylate" includes acrylate and methacrylate, for example a (C1 to C12 alkyl) acrylate or (C1 to C12 alkyl) methacrylate.

As used herein, the term "aspect ratio" refers to a value obtained by dividing a length of a structure by a diameter of the structure.

As used herein, the "conductor" refers to a structure which is electrically conductive. Similarly, the term "conductive" refers to a material having electrical conductivity.

The term "Gaussian fitting" refers to fitting a curve of the data constituting a peak into a Gaussian distribution curve by determining constants of a Gaussian function. For the Gaussian fitting, an appropriate statistical program (e.g., OriginPro 7.5 SR6 software) may be used.

The term "full width at half maximum (FWHM)" refers to a width of a spectrum curve measured between two points on the y-axis which are half of the maximum amplitude.

In an embodiment, a conductor includes a substrate; and
 a conductive layer disposed on the substrate and including a plurality of silver nanowires,
 wherein the silver nanowires include a crystal plane such that the X-ray diffraction spectrum thereof has a main peak assigned the (111) crystal plane as measured by an X-ray diffraction analysis, and
 a 2θ full width at half maximum (FWHM) of the main peak after the Gaussian fitting is less than about 0.40 degrees.

The substrate may include a transparent substrate. For example, the substrate may have average light transmittance of greater than or equal to about 90% for visible light having a wavelength of about 380 nm to about 700 nm. A material for the substrate is not particularly limited, and the substrate may include a glass substrate, a semiconductor substrate, a polymer substrate, or a combination thereof. In addition, an insulation layer and/or an electrically conductive film may be laminated to form a substrate. In non-limiting examples, the substrate may include an inorganic material such as glass, oxide glass (e.g., amorphous oxide); a polyester such as polyethylene terephthalate, polybutylene terephthalate, and polyethylene naphthalate; polycarbonate; an acryl-based resin; cellulose or a derivative thereof; a polymer such as polyimide; an organic/inorganic hybrid material; or a combination thereof. The thickness of the substrate is also not particularly limited, but may be appropriately selected without undue experimentation depending upon the desired final product. In an embodiment, the substrate may be a flexible substrate. For example, the substrate may have a flexural modulus of at least about 10 MPa, or at least about 100 MPa, or at least about 1 GPa. The flexural modulus may be measured in accordance with ASTM D412 (for example, using LRX-PLUS from Lloyd Co. Ltd.) The flexible substrate may include poly(meth)acrylate, polyolefin, polyvinylchloride, fluoropolymer, polyamide, polyimide, polysulfone, polyetheretherketone, polynorbornene, polyester, polycarbonate, polyurethane, polydimethylsiloxane, a copolymer thereof, or a combination thereof.

The substrate may have a thickness of greater than or equal to about 0.5 μm, for example, greater than or equal to about 1 μm, or greater than or equal to about 10 μm, but is not limited thereto. The substrate may have a thickness of less than or equal to about 1 millimeter (mm), for example, less than or equal to about 500 μm, or less than or equal to about 200 μm, but is not limited thereto. An additional layer (e.g., undercoat or overcoat) may be disposed between the substrate and the conductive layer as needed. For example, the additional layer may be included in the electrical conductor to control a refractive index.

The conductor includes a silver nanowire. In the conductor, a plurality of silver nanowires may form a structure (e.g., a layer) having a percolation network shape. The silver nanowire is a silver metal structure having an aspect ratio of greater than or equal to about 10, an aspect ratio of greater than or equal to about 100, or an aspect ratio of greater than or equal to about 200, for example, and may be within a range of about 10 to about 100,000. The silver nanowire may have an average diameter of less than or equal to about 100 nanometers (nm), for example, less than or equal to about 90 nm, less than or equal to about 80 nm, less than or equal to about 70 nm, less than or equal to about 60 nm, less than or equal to about 50 nm, or less than or equal to about 40 nm, but is not limited thereto. The average diameter of the silver nanowires may be determined for example by using a scanning electron microscopic analysis for a predetermined number (e.g., at least 10) of nanowires (e.g., using a high resolution SEM such as Nova 450 from FEI Co., Ltd.). An average length of the silver nanowires may be determined for example by using a scanning electron microscopic analysis for a predetermined number (e.g., at least 10) of nanowires (e.g., using a high resolution SEM such as Nova 450 from FEI Co., Ltd.).

The silver nanowire is a one dimensional (1D) structure including a face centered cubic (FCC) crystal structure. The silver nanowire has a (111) crystal plane as measured by a transmission electron microscope, and the (111) crystal plane may have a pentagonal shape which is defined by five triangular surfaces and includes a twin boundary. In the specification, the silver nanowire is also referred to "penta-twin type silver nanowire."

The silver nanowires included in the conductor exhibit a main peak in an X-ray diffraction spectrum assigned to the (111) crystal plane, and a full width at half maximum (FWHM) of the main peak after Gaussian fitting may be less than or equal to about 0.40 degrees, for example, less than or equal to about 0.38 degrees, less than or equal to about 0.36 degrees, less than or equal to about 0.35 degrees, less than or equal to about 0.34 degrees, less than or equal to about 0.33 degrees, less than or equal to about 0.32 degrees, less than or equal to about 0.31 degrees, less than or equal to about 0.30 degrees, less than or equal to about 0.29 degrees, less than or equal to about 0.28 degrees, or less than or equal to about 0.27 degrees.

The main peak assigned to the (111) crystal plane in the silver nanowire X-ray diffraction spectrum may be found, for example, within diffraction angles two-theta ($2\theta$) in a range from about 35 degrees to about 42 degrees.

A transparent conductive material included in a flexible display advantageously has an improved-level of conductivity and optical properties to such an extent that the transparent conductive material may be prevent a light emitting element layer in a liquid crystal display/organic light-emitting diode (LCD/OLED) from losing some of light from the light and its resolution. In addition, the transparent conductive material may have to maintain its conductive characteristics when subjected to a bending condition.

Much research has been conducted to apply the silver nanowires to a flexible transparent electrode material. However, the light transmittance of the conductor including silver nanowires is inverse-proportional to a concentration of silver nanowires. Accordingly, in order to secure a desirable level of light transmittance (e.g., about 90%), the conductor including silver nanowires may include the lowest amount of silver nanowires possible to provide a desired level of electric conductivity. In order to reduce the amount of silver nanowires to be included in the conductor, a technique has been developed in which, after the preparation of a conductor, the conductor is treated with a high energy pulse-type lamp or a pulse-type laser. However, in the use of such methods it has been found that the low adherence among silver nanowires or the low adherence between silver nanowires and a substrate and between silver nanowires and an overcoat layer results in increased resistance upon the bending of silver nanowires. As the thickness of a flexible display (and a conductor included therein) decreases and as the curvature radius thereof is also decreased, the bending stress applied to the flexible display, and the conductor, is greatly increased. However, prior art methods (e.g., enforcing a network of nanowires and enhancing an adherence between substrate and silver nanowires) are unable to effectively prevent the deterioration in the properties of the conductor which occurs under the increased bending stress, and such methods may be unable to achieve a desired level of flexibility. For example, in the case of the conductor including silver nanowires, the resistance is sharply increased as the number of bending cycles increases during the bending test at a curvature radius of 1 mm, and thus the resistance after the 200,000$^{th}$ bending cycle may be greater than or equal to about 2.5 times the initial resistance. Therefore, prior art methods are ineffective at preventing the sharp increase in the resistance change rate.

The inventors have found that the resistance increase suffered by the conductor including nanowires on its bending may result from the fracture in the silver nanowires included therein. It has also been found that in the case of silver nanowires having a pentagonal cross-section, the fractures may be caused by a defect included in the crystal structure of the silver nanowires.

Figure 2:
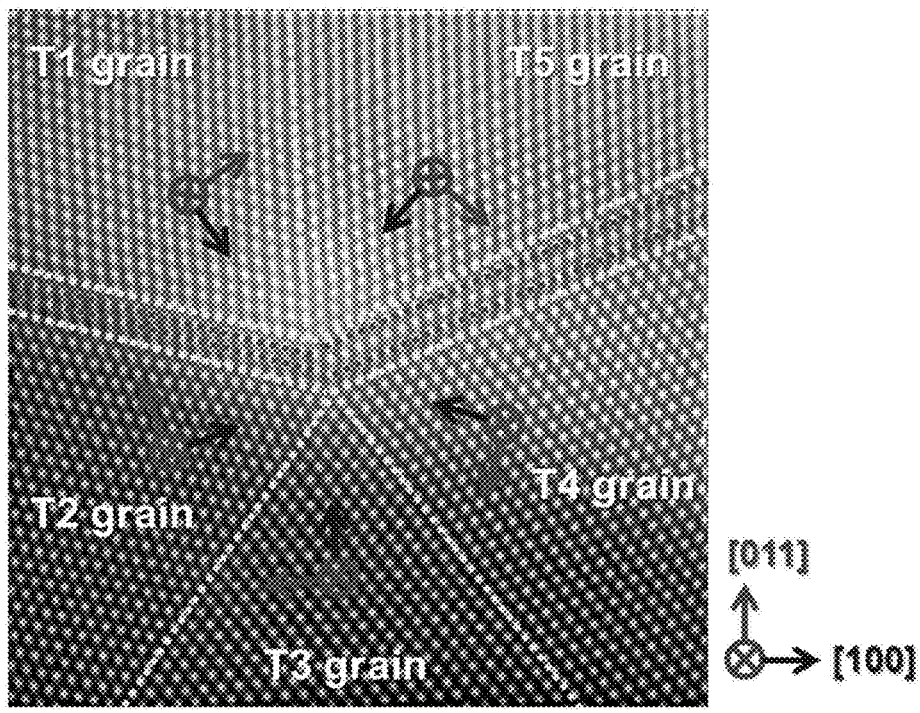
FIG. 2 is a schematic view showing a pentagonal-shaped cross-section including a twin boundary of the silver nanowire of FIG. 4.

The crystal defect in the silver nanowire is described with reference to FIGS. 1 and 2, in detail. The penta-twinned Ag NW contain a fivefold twinned nanostructure with five twin boundaries running along {111} planes in parallel to the longitudinal axis of the NWs and five surface facets (T1 to T5 grain) along {100} planes with a pentagonal cross-sectional morphology.

In the silver nanowire, the cross-section includes five triangle cross-sections (e.g. surfaces) having an unoccupied angle of about 7.35 degree (e.g. 360 degrees-352.65 degrees), and thereby the silver nanowire may include a stacking fault formed along the boundary between two surface facets. For example, for the nanowire shown in FIG. 2, the stacking fault is found at the boundary between T1 grain and T2 grain and the boundary between T4 grain and T5 grain.

Under a severe external stress such as bending at a curvature radius (e.g. bend radius) of 1 mm, also referred to herein as "1R bending", crystal lattice defects such as the stacking fault move to form a dislocation cloud, which may lead to the initiation and the propagation of cracks and the final fracturing of the material. In other words, the force applied onto the conductor during bending is a type of tensile stress. When such a stress is concentrated on the dislocation defects of atom arrangement in the silver nanowire, the dislocation defect may be a starting point of cracking and fracturing. As described above, the silver nanowire crystal may have inherent defects in a FCC penta-twin type and may also include additional stacking faults which occur during the synthesis and purification process and additional defects which occur when forming the grain boundary by reversing the crystal growing plane.

Although silver nanowires included in the conductor according to an embodiment are penta-twin type nanowires having a pentagonal cross-section, they may have rearrangement of the locations of the atoms causing the defects and thereby may show improved crystallinity. Without being limited by theory, it is believed that the improved crystallinity may be due to the fact that the main peak assigned to a (111) crystal plane in the X-ray diffraction spectrum has a decreased 2θ full width at half maximum (FWHM). For example, the main peak may have a FWHM of less than about 0.40.

When the conductor includes the aforementioned silver nanowires having a reduced level of the dislocation defect (e.g., improved crystallinity), the conductor may exhibit improved fracture resistance even when subjected to a considerable external force such as bending deformation during 1R bending. As a result, the conductor may maintain its initial value of electrical conductivity or may show a low level of resistance rate change even during a repeated (e.g., as high as 200,000 times) bending test.

Accordingly, the conductor including the aforementioned silver nanowires is measured to determine a resistance change rate ΔR (%) using the following equation:

$$\Delta R/R_0(\%)=(R_1-R_0)/R_0\times100\%$$

$R_0$ is initial linear resistance, $R_1$ is linear resistance after bending 200,000 times, and distance between electrodes for measuring linear resistance is 10 cm. The conductor is bent, for example, at a bending angle of about 180 degrees 200,000 times with an inner circle radius (or a radius of curvature of the inner circle formed at the bended portion) of about 1 mm (hereinafter, 1R bending) at room temperature (e.g., a temperature of about 20-25° C.) and a relative humidity of about 45-55% in ambient air, and the test sample is subjected to an outer bending so that a tensile strain is applied. As used herein, the term "outer bending mode" refers to the case where the conductive layer is disposed on an outer surface (i.e., an exterior surface) of a test sample as bended. The "outer bending mode" is also known as "the tensile mode." In the outer bending test, the conductive layer is exposed on the exterior surface of the bended sample. In contrast, when the test sample is bended in the inner bending mode, the conductive layer is disposed on an interior surface of the bended sample and thus cannot be seen from the outside. The inner bending mode is also known as "the compression mode."

Under the aforementioned conditions, the resistance change rate may be less than or equal to about 152%, for example, less than or equal to about 64%, or less than or equal to about 20% after 200,000 times of 1R bending. Together with the greatly improved bending characteristic, the conductor according to an embodiment may have a sheet resistance of less than or equal to about 100 ohm/sq, for example, less than or equal to about 90 ohm/sq, less than or equal to about 80 ohm/sq, less than or equal to about 70 ohm/sq, less than or equal to about 60 ohm/sq, less than or equal to about 50 ohm/sq, or even less than or equal to about 40 ohm/sq. At a haze of less than or equal to about 1.0%, the conductor may have an average light transmittance of greater than or equal to about 80%, for example, greater than or equal to about 85%, greater than or equal to about 86%, greater than or equal to about 87%, greater than or equal to about 88%, greater than or equal to about 89%, or greater than or equal to about 90% for visible light having a wavelength in a region of about 380 to 700 nm.

The conductor may include an overcoat layer (OCL) directly on the conductive layer. The overcoat layer may include a thermosetting resin, a ultraviolet (UV) curable resin, or a combination thereof. Specific examples of the thermosetting resin and ultraviolet (UV) curable resin suitable for forming the OCL are known in the art. Methods of forming the OCL on the electrically conductive layer from the aforementioned materials are also known and are not particularly limited. In an embodiment, the thermosetting resin and the ultraviolet (UV) curable resin for an overcoat layer (OCL) may include urethane (meth)acrylate, a perfluoropolymer having a (meth)acrylate group, a poly(meth)acrylate having a (meth)acrylate group, an epoxy (meth)acrylate, or a combination thereof. The overcoating layer may further include an inorganic oxide fine particle (e.g., silica fine particles).

Another embodiment relates to a population of silver nanowires having an improved crystallinity as described above (that is, wherein the X-ray diffraction spectrum shows a main peak assigned to a (111) crystal plane, and the main peak has a 2θ full width at half maximum (FWHM) of less than about 0.40 degree after the Gaussian fitting). The detailed description of the silver nanowires is the same as described above.

The population of silver nanowires having the improved crystallinity may be prepared by a method including the following steps:
dispersing a plurality of silver nanowires in a medium; and
annealing the a plurality of silver nanowires placed in the medium at a temperature of about 50° C. to about 80° C. for greater than or equal to about 30 minutes.

The silver nanowires may be a penta-twin type nanowire. In the penta-twin type nanowires, the full width at half maximum (FWHM) of main peak assigned to a (111) crystal plane is generally within a range of greater than or equal to about 0.41 degrees, for example, a range of about 0.41 degree to about 0.50 degree when measured by an X-ray diffraction analysis.

The penta-twin type silver nanowires may be prepared by a bottom-up type process. In the bottom-up type process, the nanowires may be prepared by chemical or molecule coagulation or a template-assisted electrodeposition. Details of the bottom-up type process are known in the art. For example, the silver nanowires may be synthesized by a liquid-phase reduction of a silver salt (e.g., nitrate) in the presence of polyol (e.g., ethylene glycol) and polyvinylpyrrolidone. The penta-twin type silver nanowires may be commercially available.

The medium may include water and an organic additive miscible with water. In this case, the silver nanowires may be dispersed in the medium. The organic additive miscible with water may be one or more of the various additives added to the ink composition including silver nanowires. For example, the organic additive miscible with water may be an organic solvent miscible with water. Examples of the organic additive miscible with water may include C1 to C5 linear or branched alcohols such as methanol, ethanol, propanol, isopropanol or the like, hydroxypropylmethyl cellulose, a dispersing agent such as a C2 to C20 organic acid and the like, a viscosity controlling agent, the various surfactants, or an organic binder, but is not limited thereto. The organic binder may play a role of appropriately controlling the viscosity of the composition for forming a conductive layer or of enhancing the binding force of the nanowires. Non-limiting examples of the binder may include methyl cellulose, ethyl cellulose, hydroxypropyl methyl cellulose (HPMC), hydroxypropyl cellulose (HPC), xanthan gum, polyvinyl alcohol (PVA), polyvinyl pyrrolidone (PVP), carboxyl methyl cellulose, hydroxyethyl cellulose, or a combination thereof. An amount of the binder may be appropriately selected without undue experimentation, and is not particularly limited. In non-limiting examples, an amount of the organic binder may be about 1 to about 100 parts by weight based on 100 parts by weight of the silver nanowires.

The specific composition of the medium and the content of silver nanowires dispersed therein are not particularly limited and may be appropriately selected. For example, a composition of the medium and the content of silver nanowires dispersed therein may be as shown in the following Table 1, but is not limited thereto.

TABLE 1

|  | Material | Amount (wt %) |
|---|---|---|
| Silver naowire | Ag nanowire aqueous solution (concentration: 0.001-10.0 wt %) | 5-40% |
| Solvent | water | 20-70% |
|  | alcohol (ethanol) | 0-40% |
| Dispersing agent | hydroxypropyl methyl cellulose aqueous solution (0.05-5 wt %) | 0-10% |

In another embodiment, the medium may include a polymer, and at least a portion of the plurality of silver nanowires may be embedded in the medium. The plurality of silver nanowires embedded in the medium may be disposed on the substrate. The polymer may be polyurethane, an acryl polymer such as a poly(meth)acrylate, silicone, polysilane, polyester, polyvinylchloride, polystyrene, polyolefin, a fluoropolymer, polyamide, polyimide, polynorbornene, a acrylonitrile-butadiene-styrene (ABS) copolymer, or a combination thereof, but is not limited thereto.

The medium may include the material for forming the overcoating layer. The medium may include the organic binder.

As described above, the plurality of silver nanowires dispersed in the medium (e.g., in an aqueous solution) may be treated at a temperature of about 30° C. to about 90° C., for example, about 40° C. to about 80° C., about 50° C. to about 80° C., or about 50° C. to about 70° C. In an embodiment, the plurality of silver nanowires is heat-treated (i.e., annealed) at a temperature of greater than or equal to about 50° C., for example, greater than or equal to about 55° C., greater than or equal to about 60° C., or greater than or equal to about 65° C. and less than or equal to about 80° C., for example, less than or equal to about 78° C. or less than or equal to about 75° C., for greater than or equal to about 30 minutes.

The annealing time may be, for example, greater than or equal to about 35 minutes, greater than or equal to about 40 minutes, greater than or equal to about 45 minutes, greater than or equal to about 50 minutes, greater than or equal to about 1 hour, greater than or equal to about 2 hours, greater than or equal to about 3 hours, greater than or equal to about 4 hours, greater than or equal to about 5 hours, greater than or equal to about 6 hours, greater than or equal to about 7 hours, greater than or equal to about 8 hours, greater than or equal to about 9 hours, greater than or equal to about 10 hours, greater than or equal to about 20 hours, greater than or equal to about 30 hours, greater than or equal to about 40 hours, or even greater than or equal to about 50 hours.

By annealing under the time and temperature conditions described above, the plurality of silver nanowires dispersed in the medium may show improved crystallinity. In other words, after the annealing of the silver nanowires dispersed in the medium, the full width at half maximum (FWHM) for the peak of the (111) crystal plane may be decreased. For example, the full width at half maximum of the peak of the (111) crystal plane may be less than (i.e., below) about 0.40, for example, less than or equal to about 0.38, or less than or equal to about 0.36.

The silver nanowires having the improved crystallinity are disposed on a substrate to provide a conductive layer, thereby forming the conductor according to an embodiment.

In the method, when the medium includes water or an organic additive miscible with water, the population of silver nanowires having the improved crystallinity may be prepared as an aqueous dispersion liquid. The obtained aqueous dispersion may be coated on a substrate and, selectively, dried and/or heat-treated to provide a conductive layer and to provide a conductor according to an embodiment. The aqueous dispersion may be coated on the substrate by various methods, including for example, bar coating, blade coating, slot die coating, spray coating, spin coating, gravure coating, ink jet printing, or a combination thereof. A heat curable or photocurable polymer layer (e.g., an overcoating layer) may be coated on the obtained silver nanowire conductive layer and, selectively, may be dried (e.g. using heat), and may be heat-cured or photocured.

The conductor according to an embodiment may have the improved bending characteristic. According to an embodiment, the conductor may show a resistance change rate ($\Delta R/R_0$ (%)) of less than or equal to about 152%, for example, less than or equal to about 90%, for example less than or equal to about 80%, less than or equal to about 70%, or less than or equal to about 65%, after bending at a curvature radius of 1 mm (1R bending) for 200,000 times.

The conductor according to an embodiment may be applied as a conductive material (e.g., transparent electrode, etc.) in various electronic devices. In addition, it is considered that the conductor may be also be employed for a functional glass, an anti-static film, and the like.

The electronic device may include a display, a touch screen panel, a solar cell, an e-window, an electrochromic mirror, a transparent heater, a heat mirror, a transparent transistor, transparent displacement sensor (strain sensor), a flexible battery, a flexible solar cell, a flexible display, or a combination thereof, but is not limited thereto. The conductor may exhibit enhanced flexibility and thus may find its utility in a flexible electronic device.

The electronic device may be a touch screen panel. The detailed structure of the touch screen panel is known in the art. The schematic structure of the touch screen panel is shown in FIG. 3. Referring to FIG. 3, the touch screen panel may include a first transparent electrically conductive film, a first optically clear adhesive (OCA) layer (e.g. a transparent adhesive film), a second transparent electrically conductive film, a second optically clear adhesive layer, and a window, disposed on a display panel for a display device (e.g., an LCD panel). The first transparent electrically conductive film and/or the second transparent electrically conductive film may be the conductor according to an embodiment.

An example of applying the conductor to a touch screen panel (e.g., a transparent electrode thereof) has been illustrated, but the application of the conductor is not limited thereto. For example, the conductor may be used as an electrode for other electronic devices including a transparent electrode without any particular limitations. For example, the conductor may be applied as a pixel electrode and/or a common electrode for a liquid crystal display (LCD), an anode and/or a cathode for an organic light emitting diode device, or a display electrode for a plasma display device. In addition, the conductor may be also applied as functional glass or anti-static layer.

Hereinafter, the embodiments are illustrated in more detail with reference to examples. These examples, however, are not to be interpreted as limiting the scope of this disclosure.

EXAMPLES

Measurement

[1] Measurement of sheet resistance: Sheet resistance is measured as follows.
   Measuring device: Mitsubishi Ioresta-GP (MCP-T610), ESP type probes (MCP-TP08P)
   Sample size: width 20 cm×length 30 cm
   Measurement: average of values obtained after repeating the measurement at least 9 times

[2] Measurement of light transmittance: Light transmittance is measured as follows.
   Measuring device: NIPPON DENSHOKU INDUSTRIES (NDH-7000 SP)
   Sample size: width 20 cm×length 30 cm
   Sample Measurement: average of values obtained after repeating the measurement at least 9 times

[3] Measurement of haze: Haze is measured as follows.
   Measuring device: NIPPON DENSHOKU INDUSTRIES (NDH-7000 SP)
   Sample size: width 20 cm×length 30 cm
   Sample Measurement: average of values obtained after repeating the measurement at least 9 times

[4] Scanning Electron Microscope (SEM) analysis: Scanning electron microscope analysis is performed using the following device:
   Field Emission Scanning Electron Microscope (FE-SEM), NovaNano SEM 450 (FEI Co., Ltd.)

[5] Bending test:
A specimen is mounted in a flexible tester (manufactured by COVOTECH, model name: CFT-200R) having a bending radius of 1 mm (1R bending). A bending test is conducted at room temperature (e.g., about 25° C.) under a tensile stress of 6.7% for 200,000 cycles in an outer bending mode, and a resistance change rate ΔR (%) relative to the initial resistance is measured over the repeated cycles.

$$\Delta R/R_0(\%) = (R_1 - R_0)/R_0 \times 100\%$$

ΔR: linear resistance variation ratio, $R_0$: initial linear resistance, $R_1$: linear resistance after 200,000 cycles, distance between electrodes for measuring linear resistance: 10 cm.

[6] X-ray diffraction analysis:
A sample is measured using a Bruker (D8 Advance) within a range of diffraction angles 2 theta of 35-42 degrees for 30 minutes to perform an X-ray diffraction analysis.

Comparative Example 1: Manufacture of Conductor Including Silver Nanowire Conductive Layer and Bending Test A dispersion having silver nanowires (hereinafter, AgNW) in a concentration of 0.1 weight percent (wt %) (diameter 20 nm, length 18 mm) is coated on a polyimide (PI) substrate (thickness: 125 μm) using an automated bar coater (GBC-A4, GIST) to provide a film, and the obtained film is dried at 100° C. in an air atmosphere for 3 minutes to provide a conductive layer.

The dispersion is prepared by diluting an AgNW dispersion (Ag NW concentration: 0.5 wt %, obtained from Aiden Co. Ltd.) with water. A 3 wt % solution of an urethane acrylate-based photocurable polymer (manufactured by Sukgyung AT, trade name: SG-HSTYPE30) is overcoated on the conductive layer in a thickness of 80 nm and dried at 100° C. for 3 minutes and cured by irradiating with a UV lamp (wavelength: 365 nm, light quantity: 800 millijoules per square centimeter ($mJ/cm^2$)) for 15 seconds, to provide a conductor.

The obtained conductor has a sheet resistance of 35 ohm/sq. By using the same AgNW dispersion, a conductor having a sheet resistance of 35 ohm/sq is prepared in the same manner as set forth above except that the substrate is a polycarbonate substrate having a thickens of about 50 μm. The prepared conductor has a transmittance of 90.1%, and a haze of 0.97%.

Figure 4:
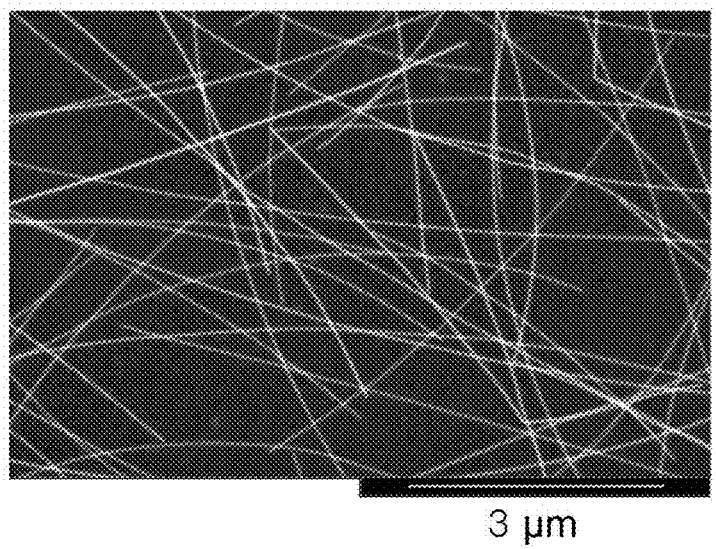
FIG. 4 is a scanning electron microscope (SEM) image of a conductive layer including the silver nanowires of Comparative Example 1.

FIG. 4 shows a scanning electron microscope image of the conductive layer of the obtained conductor. The results of FIG. 4 confirm that the obtained conductor has a percolation shape of an electrical junction having a network shape.

Figure 8:
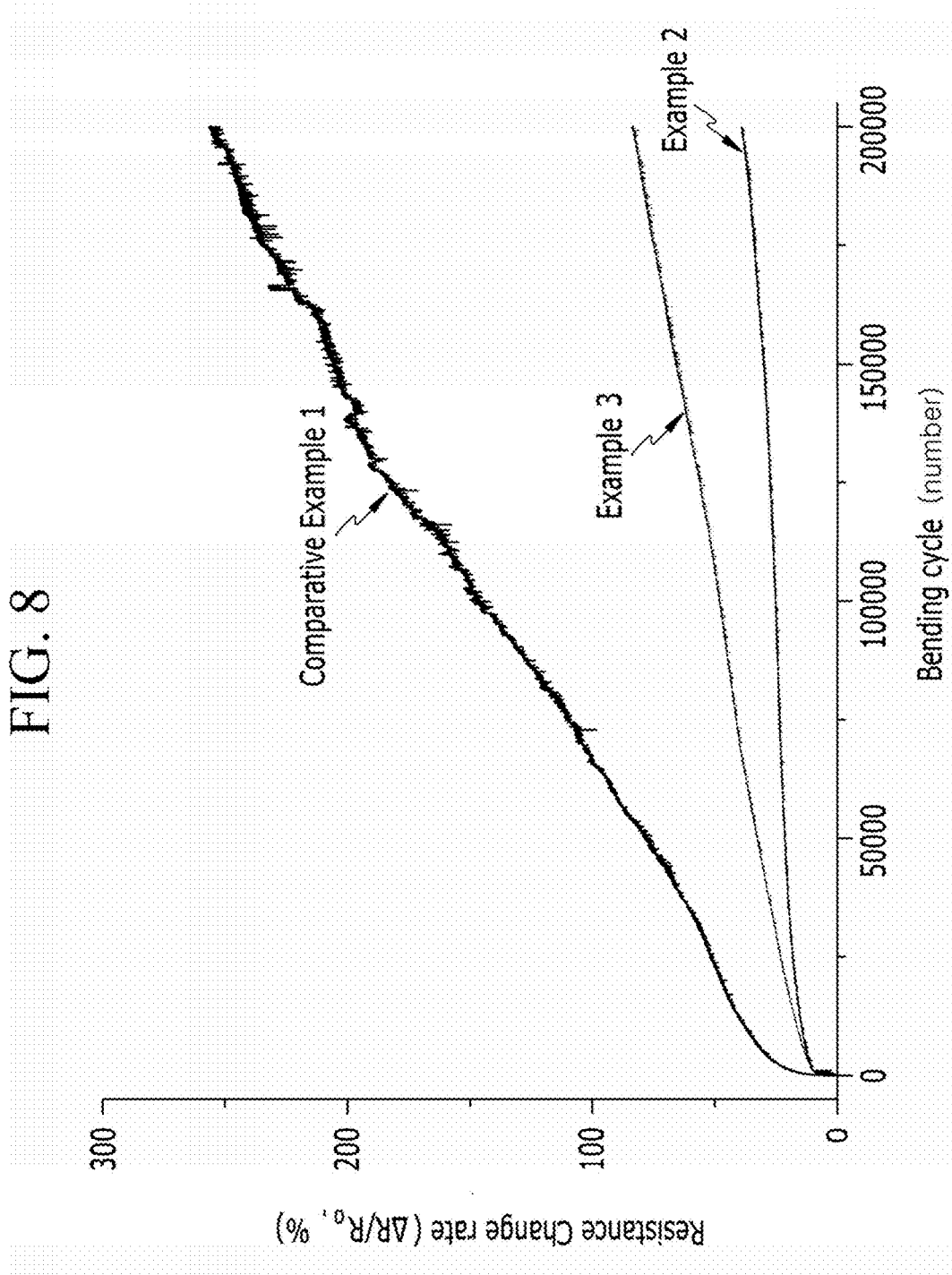
FIG. 8 is a graph of resistance change rate (%) versus bending cycle showing a resistance change rate in the electrical conductors from Example 2, Example 3, and Comparative Example 1 as they are subjected to bending 200,000 times.

A bending test is conducted for the obtained conductor on the PI substrate for several times and some results are shown in FIG. 8. The results of the bending test confirm that the resistance change rate is sharply increases as the number of bending cycles increases. The resistance change rate of the conductor is 241±57% after 200,000 cycles.

Figure 5:
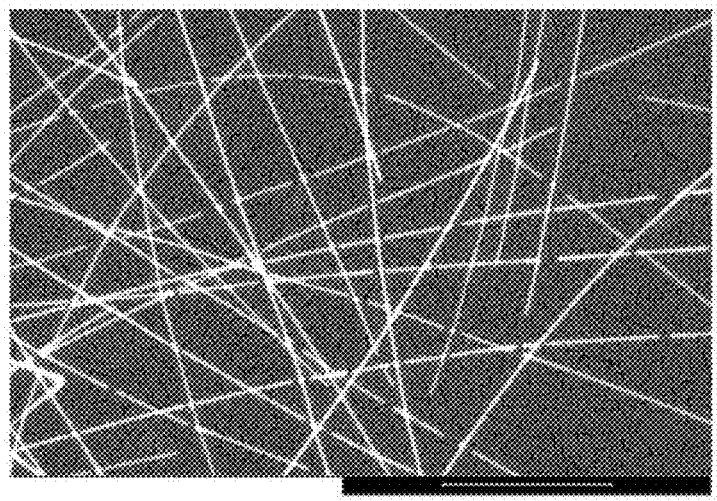
FIG. 5 is a scanning electron microscope (SEM) image of a conductive layer including the silver nanowires of Comparative Example 1 after performing a bending test on the conductive layer.

FIG. 5 shows a scanning electron microscope image of the conductive layer of the prepared conductor after completion of the bending test. From FIG. 5, the junction delamation and junction/body fracture of silver nanowires are observed. The junction delamation and junction/body fracture of the silver nanowires causes the increase in resistance change rate over the increase number of bending cycles. The increase in resistance change rate may cause failures in electronic devices (e.g., touch screen panel or touch sensor and the like) including such a conductor.

Example 1: Annealing Treatment of Silver Nanowires and X-Ray Diffraction Analysis The dispersion, which is AgNW dispersion (obtained from Aiden Co. Ltd., AgNW concentration 0.5 wt %), is placed into an oven at 70° C. and heat-treated for 12 hours, 24 hours, and 36 hours, respectively. As a control, an AgNW dispersion with no heat treatment is used.

Each of the AgNW dispersion with no heat treatment and the AgNW dispersions with the heat treatment for the different times is coated on a polycarbonate substrate (having a thickness of about 50 μm) by using an automated bar-coater to provide a film, and the film is dried at 100° C. for 5 minutes. A 3 wt % solution of urethane acrylate-based photocurable polymer (manufactured by Sukgyung AT, trade name: SG-HSTYPE30) is overcoated on the conductive layer and cured using UV irradiation in the same manner as in Comparative Example 1 to provide a conductor.

The obtained conductors may have a sheet resistance of about 7 ohm/sq. This experiment aims to clarify the effect of heat-treating on the XRD analysis results of the Ag NW and in order to obtain clear results without any substantial noise, the concentration of the Ag NW dispersion is relatively high and thus the optical properties of the conductor are not measured.

Figure 6:
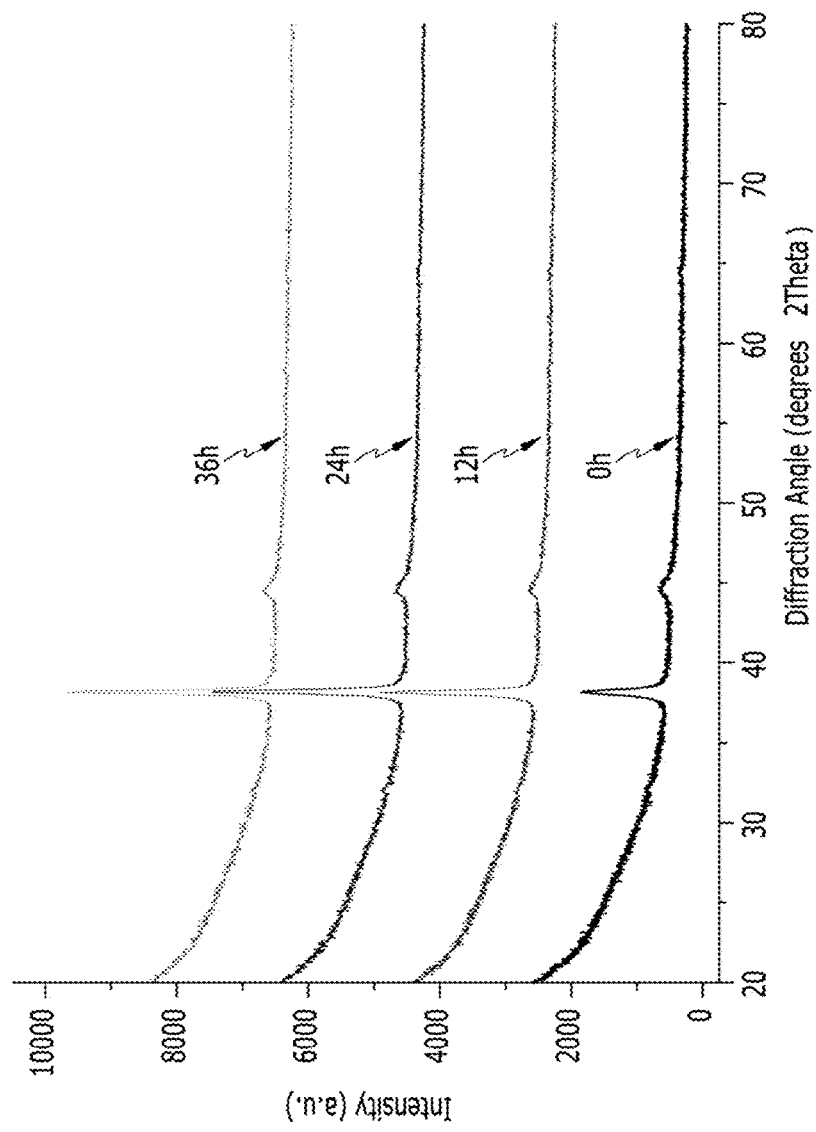
FIG. 6 is a graph of intensity (arbitrary units, a.u.) versus diffraction angle (two-theta (2θ) degrees) showing an X-ray diffraction spectrum of the silver nanowires prior to the annealing treatment (0 hour (h)) and after the annealing treatment conducted for 12, 24, and 36 h.
Figure 7:
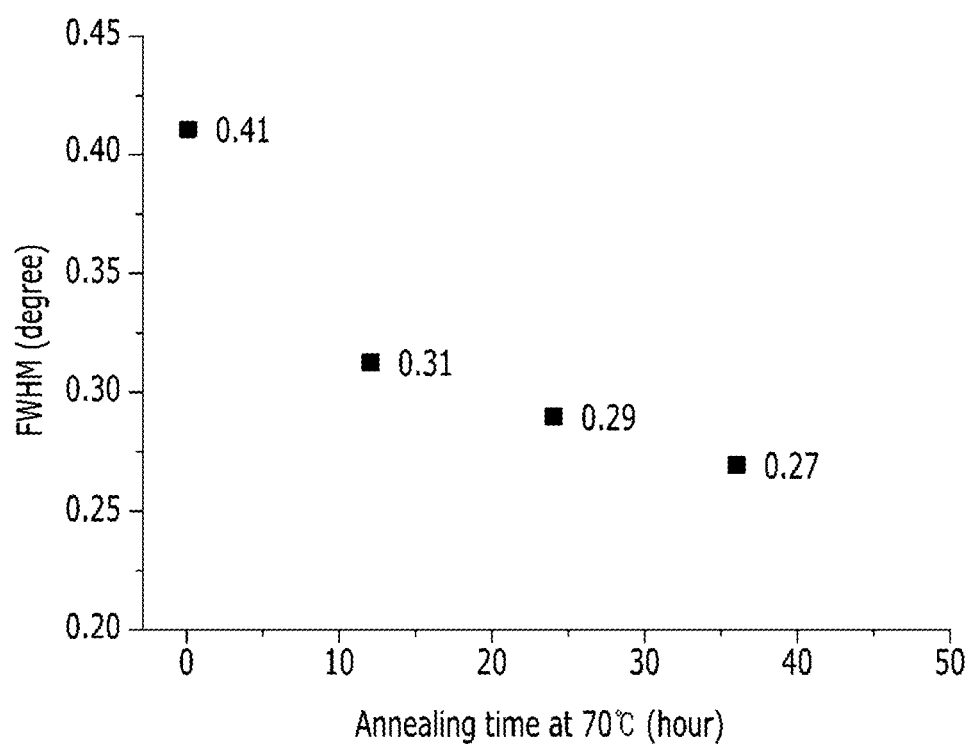
FIG. 7 is a graph a full width at half maximum (FWHM) versus annealing time at 70° C. (h) showing a change of a peak assigned to a (111) crystal plane in an X-ray diffraction analysis of silver nanowires in Example 1.
Figure 12:
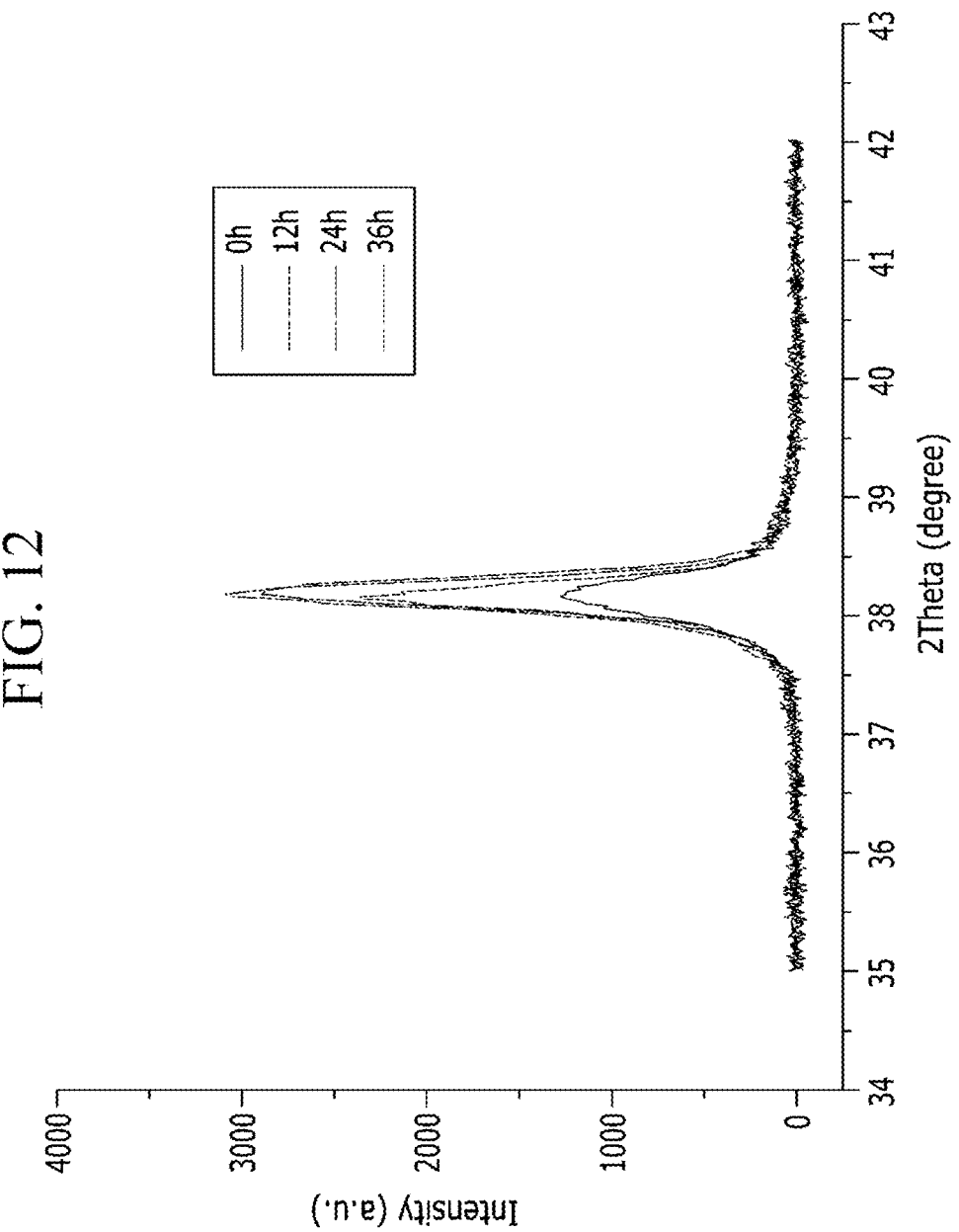
FIG. 12 is a graph of intensity (arbitrary units, a.u.) versus diffraction angle (two-theta (2θ) degrees) showing peaks assigned to the (111) crystal plane in an X-ray diffraction spectrum of the silver nanowires prior to the annealing treatment (0 hour (h)) and after the annealing treatment conducted for 12, 24, and 36 h.
Figure 13:
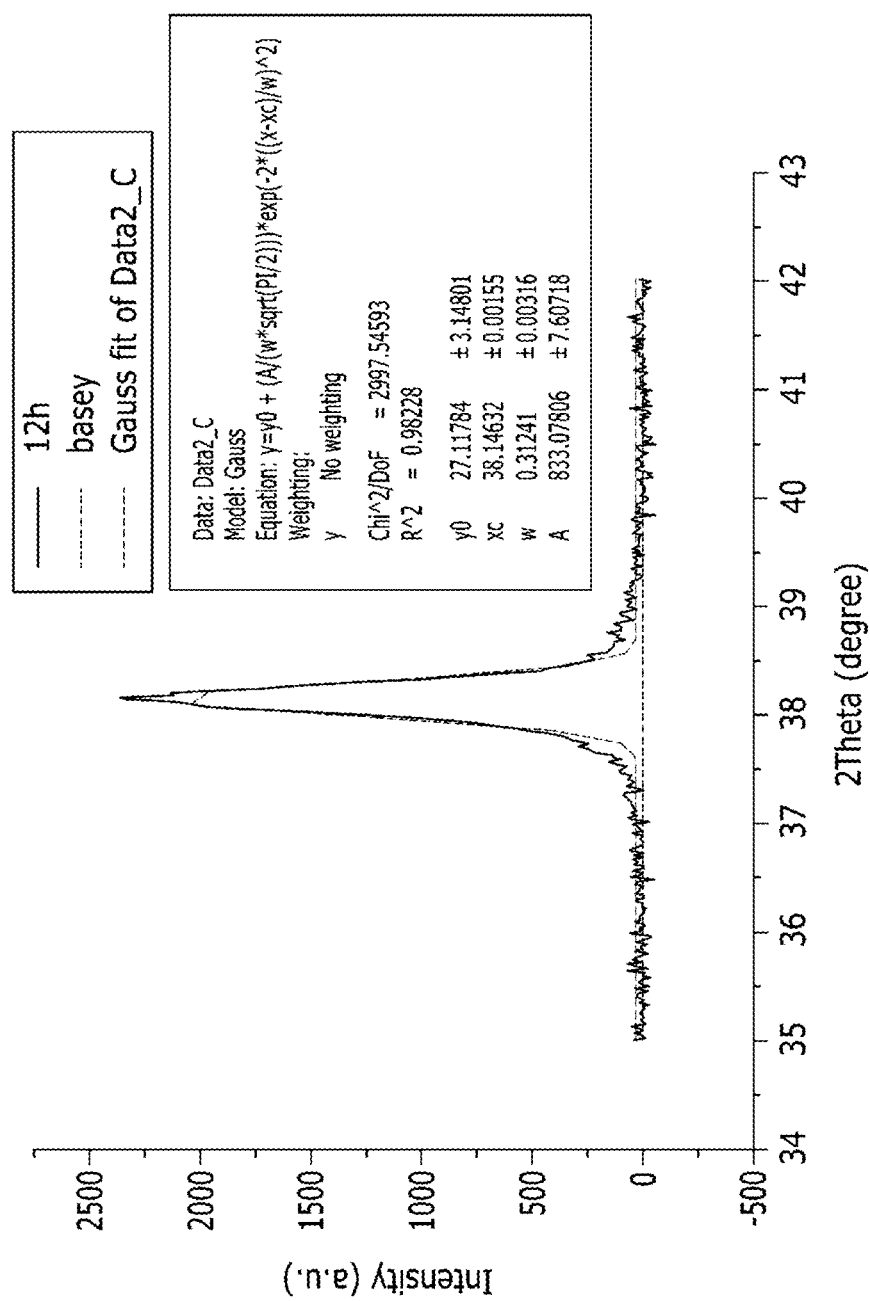
FIG. 13 is a view illustrating a Gaussian fitting process for a peak assigned to (111) crystal plane in an X-ray diffraction spectrum of the silver nanowires after the annealing treatment conducted for 12 h.
Figure 14:
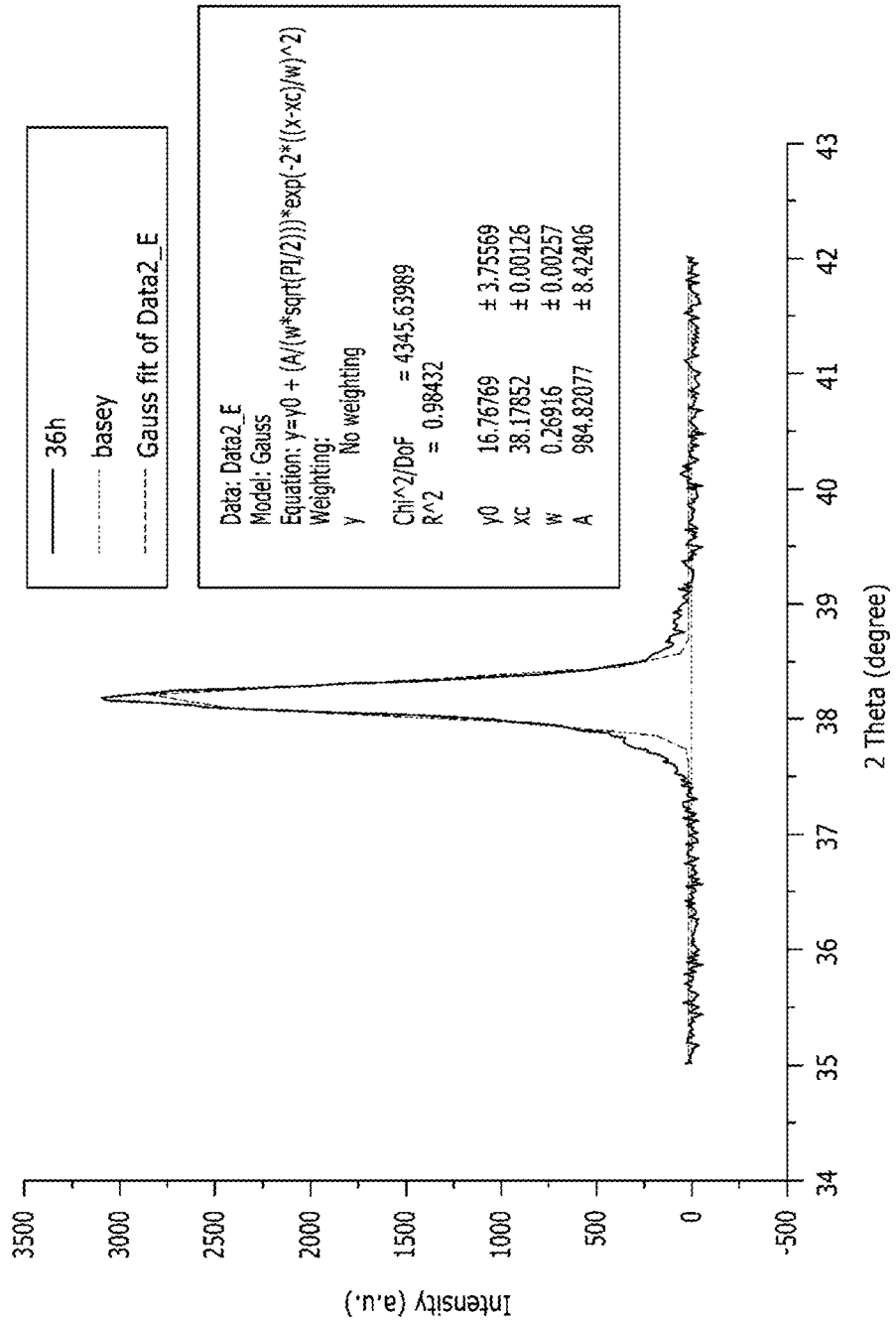
FIG. 14 is a view illustrating a Gaussian fitting process for a peak assigned to (111) crystal plane in an X-ray diffraction spectrum of the silver nanowires after the annealing treatment conducted for 36 h.

An X-ray diffraction analysis is conducted for the obtained conductor, and the results are shown in FIG. 6 and FIG. 12. After the Gaussian fitting of the main peak assigned to the (111) plane for each of X-ray diffraction spectrums, the full width at half maximum (FWHM) is calculated (see FIG. 13 and FIG. 14). The results are shown in FIG. 7.

The results of the X-ray diffraction analysis confirm that in Example 1, the heat treatment may cause a decrease in the full width at half maximum (FWHM) of the peak of the (111) crystal plane. The results may also confirm that increasing of the heat treatment time leads to a further decrease in the 2θ FWHM and the 2θ FWHM may be a function of the heat treating time.

Example 2

A conductor is prepared in the same manner as described in Comparative Example 1, except that the AgNW dispersion (AgNW concentration 0.5 wt %, obtained from Aiden Co. Ltd) is placed in an oven at 70° C. and heat-treated for 72 hours and diluted by water to provide 0.1% AgNW dispersion. The 0.1% AgNW dispersion is used to prepare the conductor.

The obtained conductor has a sheet resistance of 35 ohm/sq. By using the same AgNW dispersion, a conductor having a sheet resistance of 35 ohm/sq is prepared in the same manner as set forth above except that the substrate is a polycarbonate substrate having a thickens of about 50 μm. The prepared conductor has a transmittance of 90.1%, and a haze of 0.97%.

The conductive layer of the obtained conductor has the similar scanning electron microscope image to that of Comparative Example 1.

A bending test is conducted for the obtained conductor several times, and some results are shown in FIG. 8 together with the bending test results of Comparative Example 1. The results of the bending test confirm that the increase in the resistance change rate is significantly decreased over the repeated bending cycles when compared with Comparative Example 1. The resistance change rate is around 45±12% after the 200,000 bending cycles. Referring to the results of FIG. 7, the FWHM of the Ag NW included in the conductor may be less than or equal to about 0.27.

Figure 9:
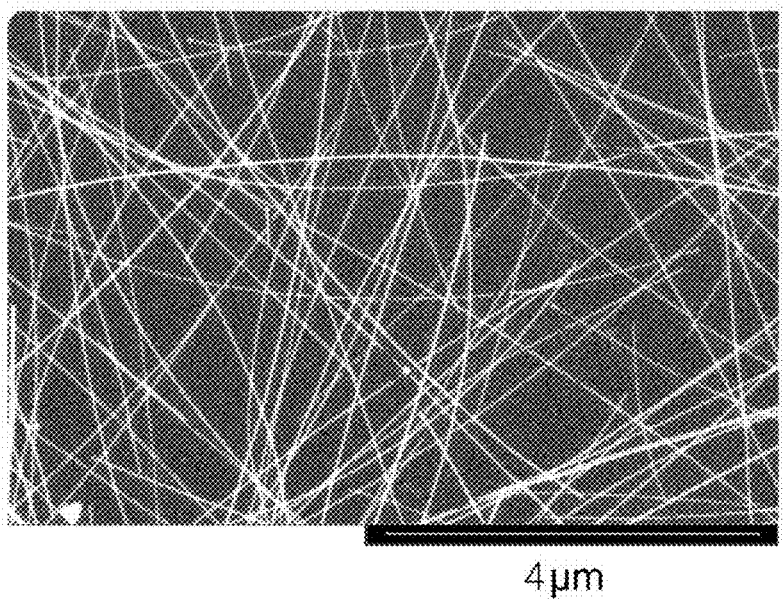
FIG. 9 is a scanning electron microscope image (magnification of 50,000×) of the silver nanowires of the electrical conductor from Example 2 after bending 200,000 times.
Figure 10:
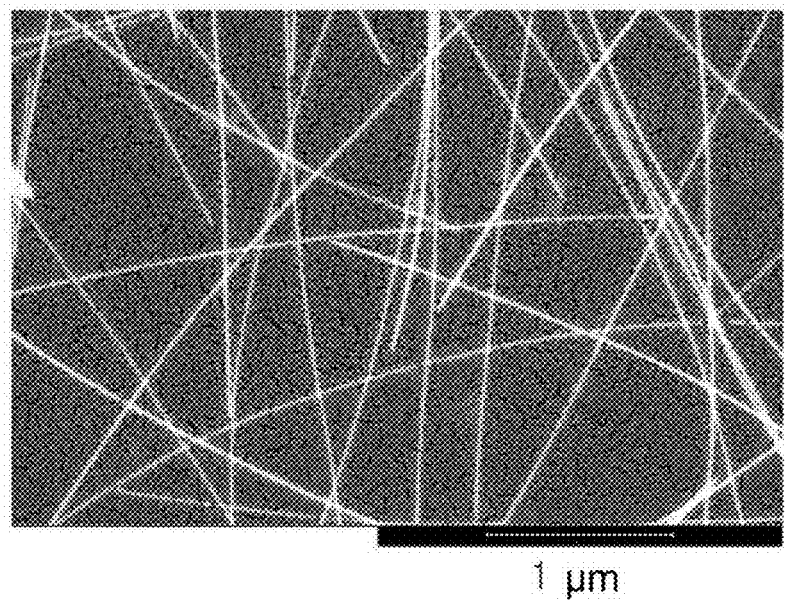
FIG. 10 is a scanning electron microscope image (magnification of 100,000×) of the silver nanowires of the electrical conductor from Example 2 after bending 200,000 times.

After the bending test of the obtained conductor, the scanning electron microscope image of the conductive layer of conductor is shown in FIG. 9 (magnification: 50,000×) and FIG. 10 (magnification: 100,000×). In comparison with the results for Comparative Example 1 shown in FIG. 5, it is confirmed that the conductor of Example 2 may have a reduced number of junction delaminations and junction/body fractures.

Example 3

A conductor is prepared in the same manner as described in Comparative Example 1, except that AgNW dispersion (Ag NW concentration 0.5 wt %, obtained from Aiden Co., Ltd.) is heat-treated in oven at 70° C. for 1 hour and diluted with water to provide a 0.1% AgNW dispersion, which is used as the AgNW dispersion to prepare the conductor.

The obtained conductor has a sheet resistance of 35 ohm/sq. By using the same AgNW dispersion, a conductor having a sheet resistance of 35 ohm/sq is prepared in the same manner as set forth above except that the substrate is a polycarbonate substrate having a thickens of about 50 μm. The prepared conductor has a transmittance of 90.1%, and a haze of 0.97%.

A bending test is conducted for the obtained conductor several times and some results are shown in FIG. 8 together with the bending test results of Comparative Example 1. The results of the bending test confirm that the resistance change rate increase is significantly decreased when compared with Comparative Example 1, and the resistance change rate is around 64±12% after the 200,000 cycle. These results and the results of FIG. 7 may imply that the FWHM of the Ag NW included in the conductor may be less than about 0.40.

Example 4

A conductor is prepared in the same manner as in Comparative Example 1, except that AgNW dispersion (Ag NW concentration 0.5 wt %, obtained from Aiden Co. Ltd) is heat-treated in oven at 70° C. for 30 minutes and diluted with water to provide a 0.1% AgNW dispersion which is to be used as AgNW dispersion liquid to prepare the conductor.

The obtained conductor has a sheet resistance of 35 ohm/sq. By using the same AgNW dispersion, a conductor having a sheet resistance of 35 ohm/sq is prepared in the same manner as set forth above except that the substrate is a polycarbonate substrate having a thickens of about 50 μm. The prepared conductor has a transmittance of 90.1%, and a haze of 0.97%.

From the bending test results of the obtained conductor, it is confirmed that the resistance change rate is around 152% on average after the 200,000 cycles. These results and the results of FIG. 7 may imply that the FWHM of the Ag NW included in the conductor is less than about 0.40.

Comparative Example 2

A conductor is prepared in the same manner as in Comparative Example 1, except that AgNW dispersion (Ag NW concentration 0.5 wt %, obtained from Aiden Co. Ltd.) is heat-treated in oven at 70° C. for 10 minutes, and diluted with water to provide a 0.1% AgNW dispersion which is to be used as AgNW dispersion liquid to prepare the conductor.

The obtained conductor has a sheet resistance of 35 ohm/sq. By using the same AgNW dispersion, a conductor having a sheet resistance of 35 ohm/sq is prepared in the same as set forth above except that the substrate is a polycarbonate substrate having a thickens of about 50 μm. The prepared conductor has a transmittance of 90.1%, and a haze of 0.97%.

From the bending test results of the obtained conductor, it is confirmed that the resistance change rate is 224±44% after the 200,000 cycles. This results imply that no substantial changes from the original value (i.e., 0.41) occur for the FWHM of the Ag NW included in the conductor.

Example 5

A dispersion including a silver nanowire (hereinafter, referred to AgNW) having a concentration of 0.1 wt % (diameter 20 nm, length 18 mm) is coated on a polyimide (PI) substrate (thickness: 125 μm) using an automated bar coater (GBC-A4, GIST) to provide a film, and the obtained film is dried at 100° C. for 3 minutes to provide a conductive layer.

The dispersion is prepared by diluting the AgNW dispersion (Ag NW concentration 0.5 wt %, obtained from Aiden Co., Ltd.) in water. A 3 wt % solution of urethane acrylate-based photocurable polymer (manufactured by Sukgyung AT, trade name: SG-HSTYPE30) is overcoated on the conductive layer and cured by UV to provide a conductor in the same manner as in Comparative Example 1.

The obtained conductor has a sheet resistance of 35 ohm/sq. By using the same AgNW dispersion, a conductor having a sheet resistance of 35 ohm/sq is prepared in the same manner as set forth above except that the substrate is a polycarbonate substrate having a thickens of about 50 µm. The prepared conductor has a transmittance of 90.1%, and a haze of 0.97%.

The obtained conductor is placed in an oven at 50° C. and heat-treated in air for 1 hour.

Figure 11:
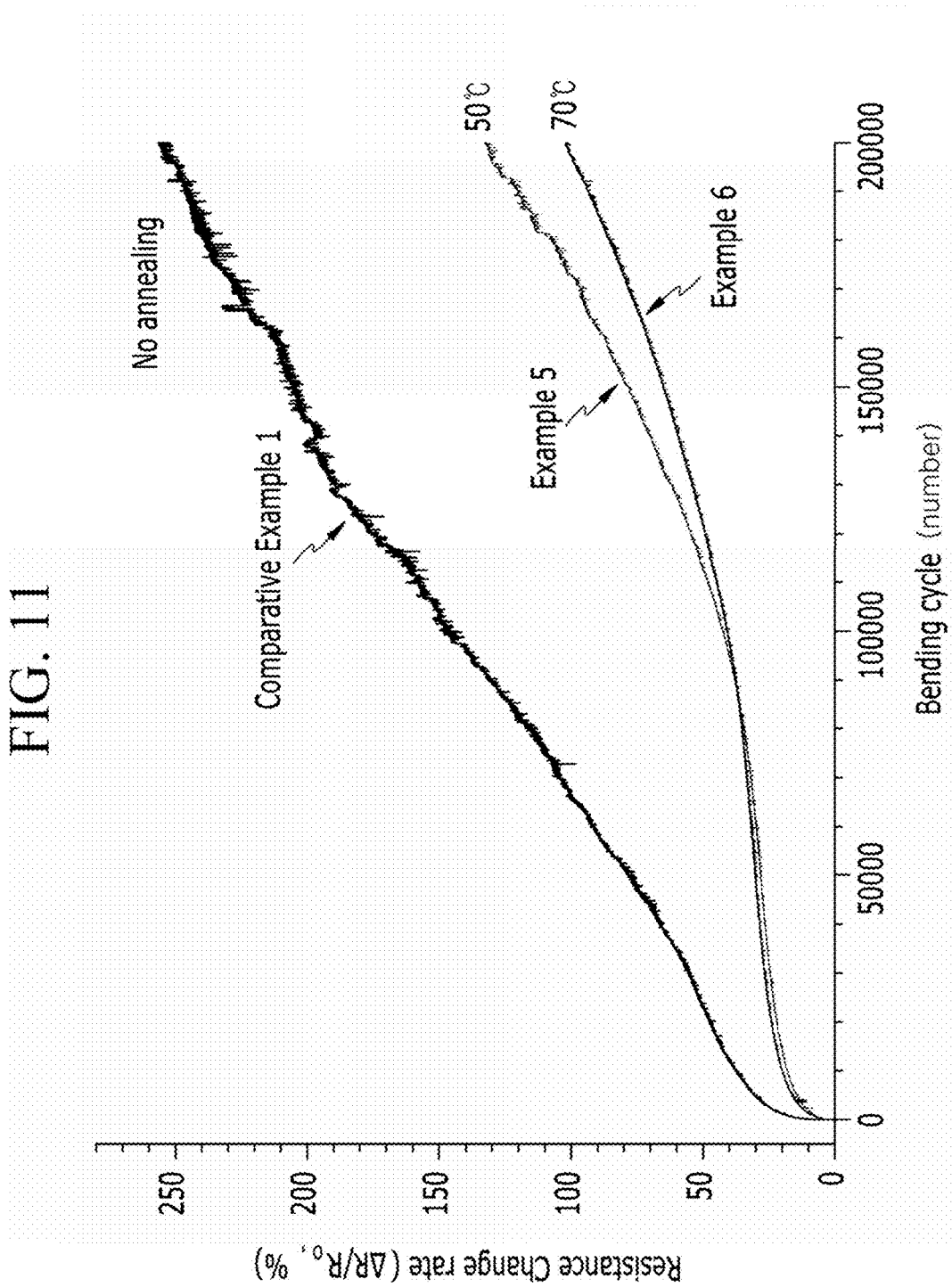
FIG. 11 is a graph of a resistance change rate (%) versus bending cycle for an electrical conductor including the silver nanowires annealed for 1 hour at various temperatures.

A bending test is conducted for the obtained conductor and the results are shown in FIG. 11 together with the bending test results of Comparative Example 1. From FIG. 11, it is confirmed that the resistance change rate increase for the conductor of Example 5 is significantly decreased according to the number of bending cycles as compared to Comparative Example 1, and that the resistance change rate is around 132% after the 200,000 cycles. These results and the results of FIG. 7 may imply that the FWHM of the Ag NW included in the conductor may be less than about 0.40.

Example 6

A dispersion including a silver nanowire (hereinafter, referred to AgNW) having a concentration of 0.1 wt % (diameter 20 nm, length 18 mm) is coated on a polyimide (PI) substrate (thickness: 125 µm) using an automated bar coater (GBC-A4, GIST) to provide a film, and the obtained film is dried at 100° C. for 3 minutes to provide a conductive layer.

The dispersion is prepared by diluting the AgNW dispersion (Ag NW concentration 0.5 wt %, obtained from Aiden Co., Ltd.) with water. A 3 wt % solution of urethane acrylate-based photocurable polymer (manufactured by Sukgyung AT, trade name: SG-HSTYPE30) is overcoated on the conductive layer and cured by UV irradiation in the same manner as in Comparative Example 1 to provide a conductor.

The obtained conductor has a sheet resistance of 35 ohm/sq. By using the same AgNW dispersion, a conductor having a sheet resistance of 35 ohm/sq is prepared in the same manner as described in Comparative Example 1 except that the substrate is a polycarbonate substrate having a thickens of about 50 µm. The prepared conductor has a transmittance of 90.1%, and a haze of 0.97%.

The obtained conductor is placed in an oven at 70° C. and heat-treated in air for 1 hour.

A bending test is conducted for the obtained conductor and the results are shown in FIG. 11 together with the bending test results of Comparative Example 1. From FIG. 11, it is confirmed that the increase in the resistance change rate is significantly decreased over the repeated bending cycles as compared to Comparative Example 1, and that the resistance change rate is around 101% after the 200,000 cycles. These results and the results of FIG. 7 may imply that the FWHM of the Ag NW included in the conductor may be less than about 0.40.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An electrical conductor comprising
   a substrate; and
   a conductive layer disposed on the substrate and comprising a plurality of silver nanowires,
   wherein the silver nanowires exhibit a main peak assigned to a (111) crystal plane in an X-ray diffraction spectrum thereof, and
   a 2θ full width at half maximum of the main peak after Gaussian fitting is less than about 0.40 degrees.

2. The electrical conductor of claim 1, wherein the substrate has a flexural modulus of at least about 10 MPa.

3. The electrical conductor of claim 2, wherein the substrate comprises poly(meth)acrylate, polyolefin, polyvinylchloride, fluoropolymer, polyamide, polyimide, polysulfone, polyetheretherketone, polynorbornene, polyester, polycarbonate, polyurethane, polydimethylsiloxane, a copolymer thereof, or a combination thereof.

4. The electrical conductor of claim 1, wherein the plurality of silver nanowires has an average diameter of less than or equal to about 100 nanometers and an aspect ratio of greater than or equal to about 100.

5. The electrical conductor of claim 1, wherein the 2θ full width at half maximum of the main peak is less than about 0.38 degrees.

6. The electrical conductor of claim 1, wherein the main peak is at diffraction angles two-theta of about 35 degrees to about 42 degrees.

7. The electrical conductor of claim 1, wherein the electrical conductor has a sheet resistance of less than or equal to about 100 ohms per square, a haze of less than or equal to about 1.0%, and a visible light transmittance of greater than or equal to about 80%.

8. The electrical conductor of claim 1, wherein the electrical conductor has a resistance change rate of less than or equal to about 152% after 200,000 times of bending at a curvature radius of 1 millimeter as measured under a strain of 6.7% at a temperature of 20 to 25° C. and a relative humidity of 45 to 55% with a distance between electrodes of 10 centimeters in an outer bending mode.

9. The electrical conductor of claim 8, wherein the electrical conductor has a resistance change rate of less than or equal to about 64% after 200,000 times of the bending at a curvature radius of 1 millimeter.

10. The electrical conductor of claim 1, wherein the electrical conductor further comprises an overcoat layer directly on the conductive layer, the overcoat layer comprising a thermosetting resin, an ultraviolet cured resin, or a combination thereof.

11. An electronic device comprising the electrical conductor of claim 1.

12. The electronic device of claim 11, wherein the electronic device comprises a display, a touch screen panel, a solar cell, an e-window, an electrochromic mirror, a transparent heater, a heat mirror, a transparent transistor, a transparent displacement sensor (strain sensor), a flexible wire electrode, a flexible solar cell, a flexible battery electrode, a flexible display, or a combination thereof.

13. A population of silver nanowires exhibiting a main peak assigned to a (111) crystal plane in an X-ray diffraction spectrum thereof and having a 2θ full width at half maximum of the main peak after Gaussian fitting of less than about 0.40 degrees.

14. The population of silver nanowires of claim 13, wherein at least one of the silver nanowires among the population of silver nanowires has a (111) crystal plane as determined by transmission electron microscopic observation to a cross-section of the nanowire; and
   the (111) crystal plane has a pentagonal cross-section defined by five triangular surfaces and comprises a twin boundary.

15. The population of silver nanowires of claim 13, wherein an average diameter of a plurality of silver nanowires in the population of silver nanowires is less than or equal to about 100 nanometers, and an aspect ratio of the plurality of silver nanowires is greater than or equal to about 100.

16. The population of silver nanowires of claim 13, wherein an average length of a plurality of silver nanowires in the population of silver nanowires is greater than or equal to about 2.5 micrometers.

17. The population of silver nanowires of claim 13, wherein the main peak has a full width at half maximum of less than or equal to about 0.38 degree after Gaussian fitting.

18. The population of silver nanowires of claim 13, wherein the main peak is at diffraction angles two-theta of about 35 degrees to about 42 degrees.

19. A method of manufacturing a population of silver nanowires of claim 13, the method comprising:
   dispersing a plurality of silver nanowires in a medium; and
   annealing the plurality of silver nanowires at a temperature of about 30° C. to about 90° C. for greater than or equal to about 30 minutes,
   wherein the population of silver nanowires exhibits a main peak assigned to a (111) crystal plane in an X-ray diffraction spectrum thereof, and
   a 2θ full width at half maximum of the main peak is decreased by the annealing.

20. The method of claim 19, wherein the medium comprises water and an organic additive miscible with water, and the plurality of silver nanowires is dispersed in the medium.

21. The method of claim 19, wherein the medium comprises a polymer, and at least a portion of the plurality of silver nanowires are embedded in the medium.

22. The method of claim 19, wherein the annealing is performed for greater than or equal to about 1 hour.

23. The method of claim 19, wherein the 2θ full width at half maximum of the main peak is about 0.41 degree to about 0.50 degree prior to the annealing.

24. The method of claim 23, wherein the 2θ full width at half maximum of the main peak is less than about 0.40 degree after the annealing.

* * * * *